United States Patent
Jagota et al.

(10) Patent No.: US 10,817,465 B2
(45) Date of Patent: Oct. 27, 2020

(54) MATCH INDEX CREATION

(71) Applicant: salesforce.com, inc., San Francisco, CA (US)

(72) Inventors: Arun Kumar Jagota, Sunnyvale, CA (US); Dmytro Kudriavtsev, Belmont, CA (US)

(73) Assignee: salesforce.com, inc., San Francisco, CA (US)

( * ) Notice: Subject to any disclaimer, the term of this patent is extended or adjusted under 35 U.S.C. 154(b) by 669 days.

(21) Appl. No.: 15/496,905

(22) Filed: Apr. 25, 2017

(65) Prior Publication Data

US 2018/0165281 A1    Jun. 14, 2018

Related U.S. Application Data

(63) Continuation-in-part of application No. 15/374,924, filed on Dec. 9, 2016, now Pat. No. 10,628,384.

(51) Int. Cl.

| | |
|---|---|
| *G06F 7/00* | (2006.01) |
| *G06F 17/00* | (2019.01) |
| *G06F 16/11* | (2019.01) |
| *G06F 7/02* | (2006.01) |
| *G06F 16/16* | (2019.01) |
| *G06F 16/24* | (2019.01) |
| *G06F 16/23* | (2019.01) |
| *G06F 16/215* | (2019.01) |
| *G06Q 10/10* | (2012.01) |
| *G06Q 30/02* | (2012.01) |

(52) U.S. Cl.
CPC .............. *G06F 16/11* (2019.01); *G06F 7/02* (2013.01); *G06F 16/16* (2019.01); *G06F 16/215* (2019.01); *G06F 16/2365* (2019.01); *G06F 16/2372* (2019.01); *G06F 16/2379* (2019.01); *G06F 16/24* (2019.01); *G06Q 10/10* (2013.01); *G06Q 30/0201* (2013.01)

(58) Field of Classification Search
CPC .......... G06F 17/3007; G06F 17/30371; G06F 17/30386; G06F 7/02; G06F 17/30374; G06F 17/30377; G06F 17/30115
USPC ....................................................... 707/687
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |

(Continued)

OTHER PUBLICATIONS

U.S. Appl. No. 13/986,251, filed Apr. 16, 2013.

*Primary Examiner* — Binh V Ho
(74) *Attorney, Agent, or Firm* — Dergosits & Noah LLP; Todd A. Noah

(57) ABSTRACT

A system identifies a first number of distinct values stored in a first field by a dataset of records. The system identifies a second number of distinct values stored in a second field by the dataset of records. The system creates a trie from values stored in a field by multiple records, the field corresponding to the first field or the second field, based on comparing the first number to the second number. The system associates a node in the trie with one of the multiple records, based on a value stored in the field by the record. The system identifies a branch sequence in the trie as a key for a prospective record, based on a prospective value stored in a corresponding field by the prospective record. The system uses the key for the prospective record to identify one of the multiple records that matches the prospective record.

20 Claims, 6 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,299,235 B2 * | 11/2007 | Sample ................. G06F 16/322 |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,908,240 B1 * | 3/2011 | Mazzagatti ........... G06F 16/284 |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,452,755 B1 * | 5/2013 | Ye .......................... G06F 16/22 707/715 |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0114927 A1 * | 4/2014 | Anderson ............ G06F 16/2365 707/687 |
| 2014/0359537 A1 | 12/2014 | Jakobson et al. |
| 2014/0372463 A1 * | 12/2014 | Samantaray ........ G06F 16/2365 707/758 |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0370478 A1 * | 12/2015 | Okajima ............. G06F 3/04895 715/780 |
| 2016/0125197 A1 * | 5/2016 | Winters .............. G06F 16/2365 707/783 |
| 2016/0342636 A1 * | 11/2016 | Braghin .............. G06F 9/5055 |

* cited by examiner

| Hospital Name | Street Address | City | State | Zip Code | Phone Number | Number of Beds |
|---|---|---|---|---|---|---|
| Regional Medical Centre | 50 Jackson Ave. | San Francisco | California | 94114 | 415-668-6000 | 503 |
| St. Francis Medical Center | 1 Medical Drive | San Francisco | California | 94114 | 628-353-4019 | 151 |
| Children's Surgery Center | 225 California St. | San Francisco | | 94114 | 415-353-9000 | 317 |
| St. Mary's Memorial Hospital | 3700 4th St. | San Francisco | California | 94158 | 415-476-1000 | 233 |
| Children's Surgery Center | 225 Clement Ave. | San Jose | California | 95116 | 408-259-2011 | 419 |
| Regional Hospital | 1 Medical Drive | Oakland | California | 94609 | 510-752-3700 | 71 |

MATCH INDEX CREATION

CLAIM OF PRIORITY

This application is a continuation-in-part application of U.S. application Ser. No. 15/374,924, filed Dec. 9, 2016, which is incorporated in its entirety herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database can store digital objects or records for each person or organization that may be able to help in achieving a goal. Each record can consist of a few standard fields, such as first name, last name, company name, job title, address, telephone number, e-mail address, fax number, and mobile phone number. For performant matching of a record against a large database of records, the database records need to be indexed. A database system can use indices to quickly identify candidates for the record to be matched, which may be referred to as a suspect record or a prospect record. The design of match keys takes recall and performance into consideration. Recall is the percentage of actual matching records that are identified by a database system. To achieve the ideal of 100% recall, a database system may need to treat every record in the database as a candidate for every suspect, which typically is not feasible, performance-wise. At the other extreme of the recall/performance spectrum, a database system can quickly search records by using narrowly focused match keys, but narrowly focused match keys may fail to identify some matching records.

A data platform enables data providers, such as data marketplace vendors and crowd-sourced database system users, to provide their datasets to organizations via the platform. After an organization acquires a dataset from the platform, the organization's database system matches the acquired dataset's records to appropriate type(s) of the organization's existing records, and uses suitable fields of data from the matching acquired records to update or add to the organization's matching existing records, thereby enriching the organization's existing records. For example, a data marketplace vendor provides a hospital dataset that includes an attribute for the number of hospital beds, a medical supplier organization purchases the dataset, the medical supplier's database system sufficiently matches hospital records from the purchased dataset to hospital records in the medical supplier's existing records, and the database system appends the number of beds from suffi- ciently matching records in the purchased dataset to sufficiently matching records in the medical supplier's existing records.

A database system's process that determines whether acquired records sufficiently match existing records may be an intensive process that matches multiple values between records and consumes a significant amount of system resources for processing each acquired record. Therefore, a database system may initially identify an acquired record that matches only one corresponding value stored by an existing record, in a shallow matching process that consumes a relatively limited amount of system resources, and then apply the intensive multiple-value matching process to each of the relatively small number of shallow matching records, thereby reducing system resource consumption. Consequently, a database system administrator needs to understand a data provider's dataset sufficiently to design multiple custom indices that the database system can use to identify acquired records that shallow match existing records. Traditionally, developing such custom indices for an acquired dataset has been a very human-intensive and time consuming operation. If data providers add specialized datasets that include differing attributes (such as hospital beds) for different entities (such as accounts, contacts, and leads) to a data platform, a human approach to laboriously designing such custom indices one-by-one for each dataset/entity combination does not scale as the specialized datasets increase in number and complexity. Moreover the suspect records may have empty or non-standardized field values, which also contributes to the complexity of human-designed custom indices.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 1 illustrates an example dataset used for match index creation, in an embodiment;

DETAILED DESCRIPTION

General Overview

Figure 2:
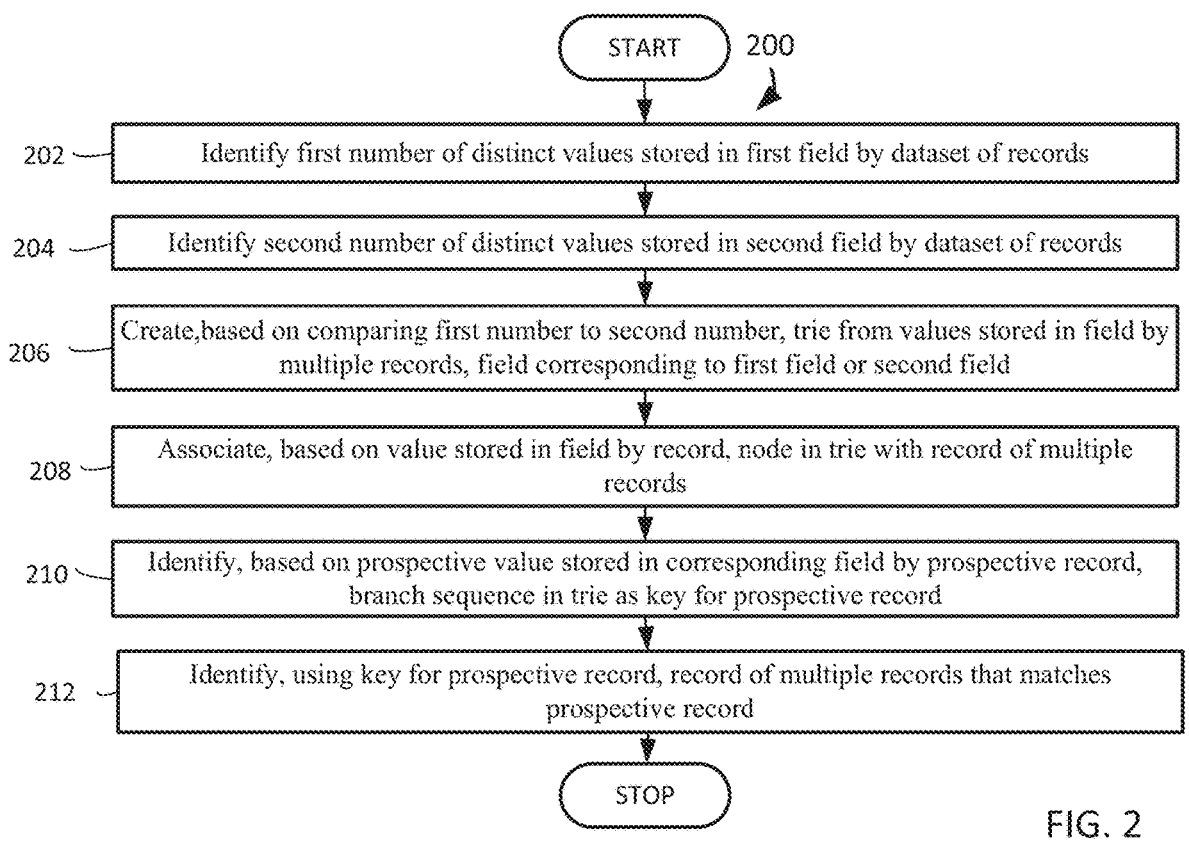
FIG. 2 is an operational flow diagram illustrating a high level overview of a method for match index creation, in an embodiment.

FIG. 1 illustrates an example dataset 100 used for match index creation, in an embodiment. Although the dataset 100 includes rows for only 6 records which include fields that store values for only 7 attributes, the dataset 100 may include rows for millions of records, with each record including fields that store values for hundreds of attributes. A database system can design a custom index based on virtually any of the fields in the dataset 100, use the custom index to identify records in the dataset 100 that shallow match with previously existing database records, and then determine whether any of the identified shallow matching records store multiple values that match any previously existing database record. A field that stores a relatively large number of distinct values can function as a better index than a field that stores a relatively small number of distinct values. An index based on a relatively large number of distinct values can enable the database system to more efficiently differentiate between records in the dataset 100 during the identification of shallow matching records, thereby identifying fewer shallow records to be processed during the resource-intensive multiple-value matching of records.

Systems and methods are provided for match index creation. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for match index creation will be described with reference to example embodiments. The following detailed description will first describe a method for match index creation.

In accordance with embodiments described herein, there are provided systems and methods for match index creation. A system identifies a first number of distinct values stored in a first field by a dataset of records. The system identifies a second number of distinct values stored in a second field by the dataset of records. The system creates a trie from values stored in a field by multiple records, the field corresponding to the first field or the second field, based on comparing the first number to the second number. The system associates a node in the trie with one of the multiple records, based on a value stored in the field by the record. The system identifies a branch sequence in the trie as a key for a prospective record, based on a prospective value stored in a corresponding field by the prospective record. The system uses the key for the prospective record to identify one of the multiple records that matches the prospective record.

For example, a database system identifies 5 distinct values stored in the hospital name attribute field by the 6 dataset records depicted in FIG. 1. The database system identifies 4 distinct values stored in the zip code attribute field by the 6 dataset records. Since the 5 distinct hospital name values are more than the 4 distinct zip code values, the system creates a trie based on values stored in the hospital name attribute field by the 6 dataset records. Since the $1^{st}$ dataset record stores the value "Regional Medical Centre" in the hospital name attribute field, the system stores the $1^{st}$ dataset record in the trie node that follow the branches "Regional" and "Medical." The system identifies the branch sequence "Regional Medical" in the trie as a key for the previously existing database record that stores "Regional Medical Center" in the organization name attribute field, which is mapped as equivalent to the hospital name attribute field. The database system uses the "Regional Medical" key to identify the $1^{st}$ dataset record, which stores the value "Regional Medical Centre" in the hospital name attribute field, as a shallow match for the previously existing database record that stores "Regional Medical Center" in the organization name attribute field. The database system was able to identify the records as shallow matching, even though their name values did not match exactly, using a key based on only the first 2 words of the prospective record's 3 word organization name value.

While one or more implementations and techniques are described with reference to an embodiment in which match index creation is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Examples of attributes which have a discrete set of values include hospital name, street address, city, zip code, state, phone number, and number of beds. The post-list of a value of an attribute can be the set of records in the dataset having that value for that attribute. For example, the post-list of "San Francisco" for the city attribute field in FIG. 1 is 4 because 4 records in the dataset store the value "San Francisco" in the city attribute field. The lookup cost of an attribute in a dataset can be the number of records in the dataset having a value for the attribute divided by the number of distinct values of the attribute in the dataset, which is the average post-list size of the distinct values of this attribute in the dataset. For example, the lookup cost of the city attribute field in FIG. 1 is calculated by dividing 6, which represents the 6 records that have a value for the city attribute field, by 3, which represents the 3 distinct values ("San Francisco," "San Jose," and "Oakland") of the city attribute field, to result in a lookup cost of 2.0. Consequently, the lookup cost for an attribute can be the number of records that a database system will look up for a value of this attribute randomly chosen from the set of its distinct values in the dataset. Attributes with lower lookup cost values will tend to form more efficient indices because the database system retrieves fewer records when using such indices. The lowest lookup cost is 1.0, which occurs when the values stored in an attribute's field uniquely identify each of the records in the dataset. For example, a database that stores 500 unique social security numbers in the social security attribute field of records for 500 employees has a lookup cost of 1.0 (500 records that have values in their social security attribute field divided by the 500 unique social security numbers), such that each social security number uniquely identifies an employee record.

The algorithm below is fully generic. It requires no knowledge of the semantics—or even data type—of any attribute field in a data provider's dataset. The algorithm inputs a dataset from a provider and a mapping of (some)

attribute fields in the dataset to standardized attribute fields in the data platform. Then the algorithm identifies those attribute fields which have both low lookup costs and are also mapped to standardized attribute fields. If a data provider's attribute field is mapped to a standardized attribute field, this is a strong indicator that the data provider's attribute field is useful for shallow matching acquired records to existing records. At indexing time, the database system builds a trie for each of these identified attribute fields. The database system uses such a trie to look up indices for any given value. For example, a dataset from a data vendor has the attributes: hospital name, street address, city, zip code, state, phone number, and number of beds. Some of these attributes have been mapped to standardized attribute fields in the data platform:
hospital name→organization name
street address→street address
city→city
zip code→postal code
state→state/province
phone number→telephone number From this set of attribute fields mapped to standardized attribute fields, the database system identifies those attribute fields that have low lookup costs in the dataset. For example, since the 6 records in FIG. 1 whose attribute field store values for the hospital name attribute are storing 5 distinct hospital name values, the lookup cost for the hospital name attribute equals 1.2, which is 6 divided by 5. The attributes for street address and phone number also have lookup costs of 1.2 or lower. In contrast, the attributes for city, state, and zip code all have lookup costs of 1.5 or higher. Consequently, the database system identifies hospital name, street address, and phone number as the best 3 attributes for building indices.

The database system indexes each record in the dataset with three keys—one for each of these attributes. In effect, this enables the database system to efficiently look up a hospital by the hospital name, the street address, or the phone number.

The hospital name attribute is an example of a text—valued attribute. The previous example of computing this attribute's lookup cost was based on treating each text value as a distinct value, which assumes that the database lookups will not be fuzzy lookups. Examples of fuzzy lookups include prefix lookups and other fuzzy variants in lookups. A prefix lookup occurs when the database system looks up a value that is a prefix of a full value in the dataset. For example, a hospital name in a vendor's dataset is listed as "Regional Hospital," while one of the database system's existing records stores data values for the same hospital, but stores the hospital's full name "Regional Hospital and Research Center." Other fuzzy variants in lookup occur when one version of a value is a misspelled, an alternatively spelled, an abbreviated, or an additional word version of the same value. For example, a record that stores "Regional Medical Centre" as the hospital name may store data for the same hospital that is identified in other records by the hospital names "Regional Medical Center," "Regional Medical Centrer," and "SF Regional Medical Center."

An attractive way to accommodate fuzzy lookups is for the database system to index suitable prefixes of text—valued attributes, such as organization name, which accommodates fuzzy variations outside of the prefix. As an example, the database system indexes the company name "Bank of America" with the prefix "bank." The misspelled version "Bank of Amrica" has the same prefix "bank." The lookup cost of an attribute whose keys are value—dependent prefixes are calculated as follows. The database system stores a certain threshold t in advance, such as t=1,000. For each distinct value of this attribute in the dataset, the smallest prefix of this value is chosen whose lookup would yield no more than t records in the dataset. For example, t=1,000 for a database of 100 million organization records. When processing the organization name "National Institutes of Health," the database system identifies more than 1,000 records in the database whose organization names start with the word "national," but only 500 records whose organization name starts with the words "national institutes." Therefore, the database system indexes "National Institutes of Health" with the prefix "national institutes." As previously described, for a given dataset, the prefix of a text-valued attribute such as organization name that will be used to index a particular name is uniquely determined. The lookup cost of this attribute can be the average number of records that will be looked up in this dataset, where the average is taken over the distinct prefixes of the set of values of this attribute in dataset records.

For example, a dataset has 1 million company records, and for the chosen threshold t, the organization name field generates 1,000 distinct prefixes. For each of these prefixes, the database system identifies the number of records in the dataset whose organization name has this prefix, and calculates the average number of records as the lookup cost. Note that the lookup cost cannot be larger than t because no prefix indexes more than t records. However, depending on the dataset, the lookup cost could be much smaller than t. When this is the case, the database system can identify such an attribute as serving well for an index.

Numeric attributes either have unbounded values, or values that are "infinitely dense" in a bounded range, or both. For example, the right tail is unbounded for the attribute "number of employees" because an upper bound cannot be fixed on the number of employees that has zero chance of ever being wrong. Another, more practical, way to look at this is that if an upper bound is chosen which a reasonably has near—zero chance of ever being crossed, this upper bound will be so large that its presence will skew the distribution unnaturally. For example, if an estimate is made that no company could have more than 5 million employees, the number 5 million itself is so large that it skews the distribution excessively. This skew makes it impossible to choose a uniform binning that could be used as a proxy for this attribute, to make binning categorical so that the database system can compute the lookup cost using this binning. To yield the most generality, the attribute's values are modeled as being generated from an unknown distribution on a certain (possibly unknown) interval [a, b]. Given the multi-set of the actual values of this attribute in the dataset, a "good" binning of the data is estimated. The lookup cost for this attribute is then the lookup cost under this binning. The minimum and maximum values of the attribute in the dataset may be heuristically chosen as a and b. A parameter p may be introduced that denotes the average number of values in a bin, such that p is small enough so that the binning is as fine—grained as possible but large enough so that, on average, each bin is sufficiently well populated. A reasonable choice may be p=10. For a given p, the number of bins—all of the bins with the same width—is $n_b=n/p$. Here n is the size of the multi-set of this attribute's values in the dataset. Now that the database system has the binning, the database system replaces every value of this attribute by its bin identifier. This results in a multi-set with a fixed set of values, such as a categorical attribute, whose lookup cost was previously defined.

Attribute A and attribute B may have the same average post—list size in a dataset, but the post—list size of attribute A may have a much higher variance than the post—list size of attribute B. That is, while on average lookups on both attributes would find the same number of records, on some keys, lookups on attribute A might find a much larger number of records than of lookups on attribute B. In other words, while lookups on both attributes have the same average—case performance, lookups on attribute A have a poorer worst—case performance than lookups on attribute B. In view of this, an index of attribute B is better than an index on attribute A. The worst—case version of lookup cost is as follows. Consider the sample of post-list sizes of a suitable set of keys. For a discrete attribute, the keys are its values; for a numeric attribute the keys are its values under a "good" binning; for a text—valued attribute the keys are suitable prefixes of the values. Let m denote the mean post-list size and s its standard deviation. Then m+as, where a is 2 or 3, is a good approximation of the worst—case post-list size.

FIG. 2 is an operational flow diagram illustrating a high level overview of a method 200 for match index creation. A first number of distinct values stored in a first field by a dataset of records is identified, block 202. The database system creates a record matching index based on an attribute field that stores a relatively large number of distinct values. For example and without limitation, this can include the database system identifying 5 distinct values stored in a hospital name attribute field by the dataset of 6 records depicted in FIG. 1, which results in a lookup cost of 1.2 for the hospital name attribute field. The distinct values may include distinct prefixes of text values, each distinct prefix being associated with a number of records that is less than a record threshold. For example, the database system uses 5 distinct prefixes of text values to refer to the hospital names in FIG. 1: "Regional Medical" to uniquely refer to "Regional Medical Centre," "Regional Hospital" to uniquely refer to "Regional Hospital," "St. Francis" to uniquely refer to "St. Francis Medical Center," "St. Mary's" to uniquely refer to "St. Mary's Memorial Hospital," and "Children's" to refer to the two instances of "Children's Surgery Center." The lookup cost of prefixes for the hospital name attribute field is 1.2, which is based on 6, which represents the records that are referenced by prefixes of hospital name text values, divided by 5, which represents the 5 distinct prefixes of hospital names. Similarly, the lookup cost of values of the prefixes for the street address attribute field is 1.2 based on 6, which represents the 6 records that are referenced by prefixes of street address text values, divided by 5, which represents the 5 distinct prefixes of street addresses. The lookup cost of values of the prefixes for the telephone number attribute field is 1.0 based on 6, which represents the 6 records that are referenced by prefixes of telephone number text values, divided by 6, which represents the 6 distinct prefixes of telephone numbers. Even though the lookup cost for the telephone number is the lowest, the database system may create match indices in addition to a match index based on the telephone number attribute because an organization may have multiple telephone numbers that do not match the existing database's telephone number for the organization. For example, the dataset stores a central switchboard telephone number for a hospital, while a medical supplier's database stores the telephone number for the hospital's purchasing agent.

A number can be an arithmetical value, expressed by a word, symbol, or figure, that represents a particular quantity and is used in making calculations and for showing order in a series or for identification. A distinct value can be a symbol that is recognizably different from other symbols. A field can be a part of a record, representing an item of data. A dataset can be a collection of related groups of information that is composed of separate elements but can be manipulated as a unit by a computer. A record can be the storage of at least one value in a persistent form.

Having identified a first number of distinct values, a second number of distinct values stored in a second field by the dataset of records is identified, block 204. The database system does not create a record matching index based on an attribute field that stores a relatively small number of distinct values. By way of example and without limitation, this can include the database system identifying 4 distinct values stored in a zip code attribute field by the 6 dataset records, which results in a lookup cost of 1.5 (6 divided by 4). Additionally, the lookup cost for the city attribute field is 2.0 (6 divided by 3, which represents the 6 records that store values in the city attribute field and the 3 distinct values stored in the city attribute field). Furthermore, the lookup cost for the state attribute field is 5.0 (5 divide by 1, which represents the 5 records that store values in the state attribute field and the 1 distinct value stored in the state attribute field).

After identifying the number of each field's distinct values, a trie is created from values stored in a field by multiple records, the field corresponding to the first field or the second field, based on comparing the first number to the second number, block 206. The database system creates a record-matching trie based on an attribute field with a low lookup cost. In embodiments, this can include the database system creating a trie based on values stored in the hospital name attribute field by the 6 dataset records because the 5 distinct hospital name values are more than the 4 distinct zip code values, which results in the lookup cost of 1.2 for the hospital name attribute field, which is lower than the lookup cost of 1.5 for the zip code attribute field. For this example, the multiple records are the dataset of records, and the field corresponding to the first field or the second field is a field in the dataset of records, with the trie being created from values stored in whichever of the two fields stores the higher number of distinct values. Also for this example, the comparing of the first number to the second number is based on comparing the first lookup cost, which has the first number in its denominator, to the second lookup cost, which has the second number in its denominator. This example may be based on the database system creating a trie from the 6 dataset records and using the quickly created trie to slowly evaluate shallow matches for the database system's 1 million existing records.

Alternatively, the database system creates a trie based on values stored in the organization name attribute field by the database system's existing records, because the lookup cost for the hospital name attribute field is relatively low, and the hospital name attribute field in the data set is mapped to the organization name attribute field in the database system's existing records. For this example, the multiple records are the existing database records, and the field corresponding to the first field or the second field is a field in the existing database records, with the trie being created from values stored in the existing database record field that is mapped with whichever of the two dataset fields stores the higher number of distinct values. Also for this example, the comparing of the first number to the second number is based on comparing the first lookup cost, which has the first number in its denominator, to the second lookup cost, which has the second number in its denominator. This example may be based on the database system creating a trie from the database system's 1 million existing records and using the slowly created trie to quickly evaluate shallow matches for the 6 dataset records.

A trie can be a tree-like ordered data structure that is used to store a dynamic set or associative array of values, where the search keys are usually strings. A value can be the symbols on which operations are performed by a computer, being stored and transmitted in the form of electrical signals and recorded on magnetic, optical, or mechanical recording media.

Comparing the first number of distinct values stored in the first field to the second number of distinct values stored in the second field may be further based on counts of each distinct value stored in the first field and counts of each distinct value stored in the second field. For example, since the lookup cost for attribute A is the same as the lookup cost for attribute B, the database system uses the counts of each distinct value for attribute A and the counts of each distinct value of attribute B to calculate the variance of the lookup cost for attribute A and the variance of the lookup cost for attribute B. Consequently, the database system creates a trie based on values stored in the attribute field that has the lowest variance in lookup cost, which results in fewer worst-case scenarios for lookups. A count can be an arithmetical value, expressed by a word, symbol, or figure, representing a particular quantity and used in making calculations and for showing order in a series or for identification.

Comparing the first number of distinct values stored in the first field to the second number of distinct values stored in the second field may be further based on a count of numeric bins associated with values stored in the first field and a count of numeric bins associated with values stored in the second field. For example, the lookup cost for the numerical attribute X is 1.0 based on 10 divided by 10, because the 10 dataset records that store values for numerical attribute X store their values in 10 bins, and the lookup cost for numerical attribute Y is 2.0 based on 10 divided by 5, because the 10 dataset records that store values for numerical attribute Y store their values in 5 bins. Therefore, the database system creates a trie based on the numerical attribute X due to its lower lookup cost than the lookup cost of numerical attribute Y. A numeric bin can be a receptacle for storing arithmetic values.

Creating the trie may include tokenizing the values stored in the field by the multiple records, and creating the trie from the tokenized values, each branch in the trie labeled with one of the tokenized values, each node storing a count indicating a number of records associated with a tokenized value sequence beginning from a root of the trie. For example, the database system tokenizes the organization names for the existing database records, including tokenizing National Institute of Health as <national, institute, of health>, National Cancer Center as <national, cancer, center>, National Science Board as <national, science, board>, Amazon Web Services as <amazon, web, services>, Amazon A9 as <amazon, a9>, Starbucks Coffee as <starbucks, coffee>, and Starbucks Manufacturing as <starbucks, manufacturing>, as depicted by the trie 300 in FIG. 3. Continuing the example, the database system creates the trie 300 that includes a branch labelled national from the trie root to a first sequential node; branches labelled institute, cancer, science from the first sequential node to the second sequential nodes; branches labelled of, center, and board from the second sequential nodes to the third sequential nodes, and a branch labelled health from a third sequential node to a fourth sequential node.

Tokenizing can be the process of dividing a stream of text into words, phrases, symbols, or other meaningful elements, which may be referred to as tokens. A tokenized value can be a symbol or text divided into words, phrases, symbols, or other meaningful elements. A branch can be a subdivision or a lateral extension extending from the main part of a tree or a trie. A node can be a connecting point at which lines or pathways in a tree or trie intersect or branch. A tokenized value sequence can be a particular order in which divided words, phrases, symbols, or elements follow each other. A root can be the originating point of a tree or trie.

Following the creation of the trie, a node in the trie is associated with a record of the multiple records, based on a value stored in the field by the record, block 208. The database system stores records in the trie's node for future shallowing matching with prospective records. For example and without limitation, this can include the database system storing the $1^{st}$ dataset record depicted in FIG. 1 in the node that follow the branches "Regional" and "Medical" because the $1^{st}$ dataset record stores the value "Regional Medical Centre" in the hospital name attribute field. For this example, the node in the trie is associated with a dataset record based on a value stored in the field by the dataset record.

Alternatively, the database system stores a record from the database system's 1 million existing records into the node that follow the branches "Regional" and "Medical" because the record stores the value "Regional Medical Center" in the organization name attribute field. For this example, the node in the trie is associated with an existing database record based on a value stored in the field by the existing database record.

Figure 3:
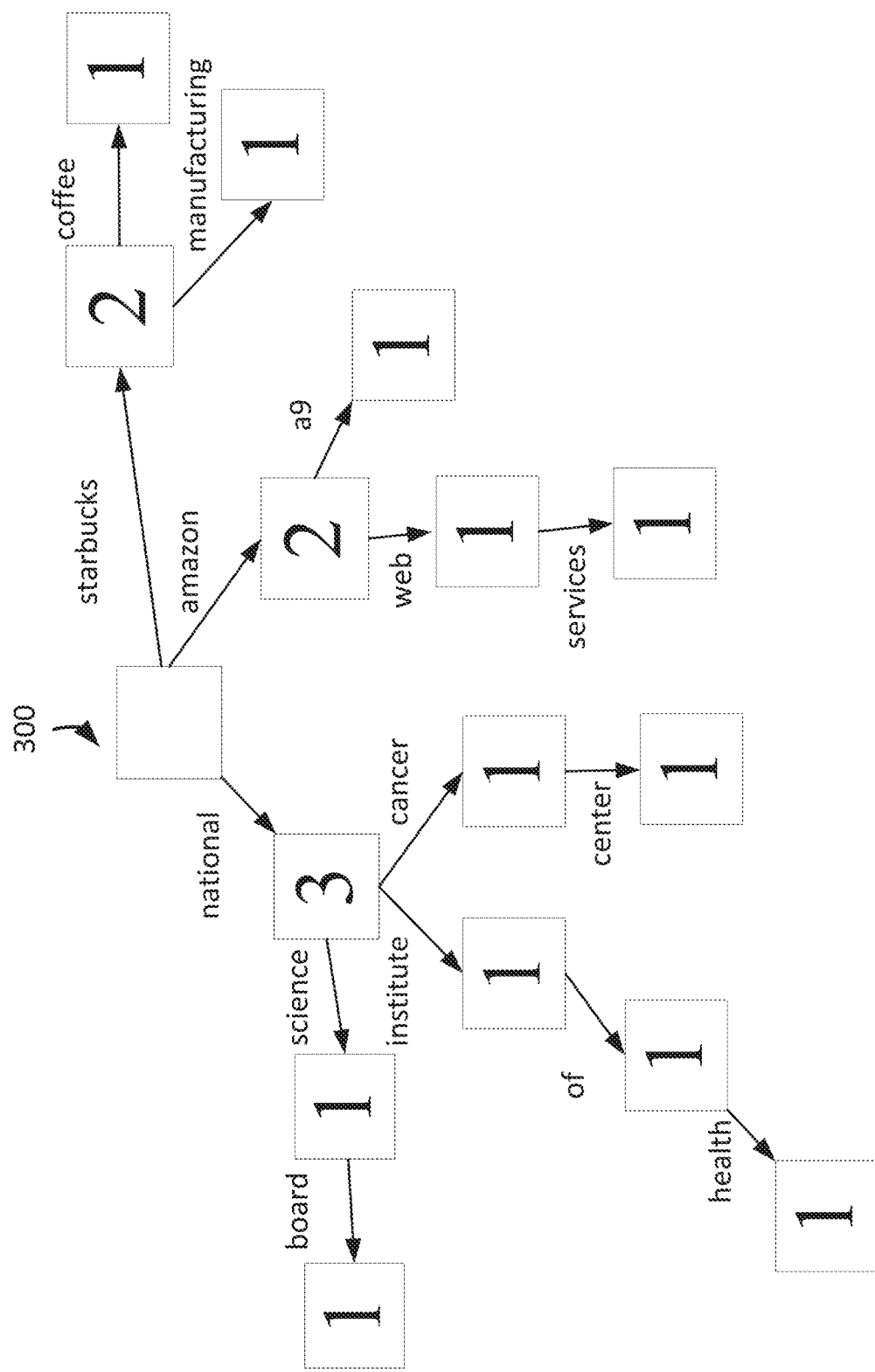
FIG. 3 illustrates an example trie used to match records, in an embodiment.

Associating the node in the trie with the record may include tokenizing the value stored in the field by the record; identifying each node, beginning from a root of the trie, corresponding to a token value sequence associated with the tokenized value, until a node is identified that stores a count less than a node threshold; identifying a branch sequence that includes each identified node as a key for the record; and associating the key with the node, and the record with the key. For example, the database system tokenizes the organization name National Institute of Health as <national, institute, of health> for a database record during the indexing phase. Continuing the example, the database system uses the tokenized values national, institute, of health to identify that a first sequential node in the trie 300 stores the count 3 for the token value sequence national, and stops after identifying that a second sequential node in the trie 300 stores the count 1 for the token value sequence national, institute, because this second sequential node's count 1 is less than the token threshold count of 2.5, as depicted in FIG. 3. Further to the example, the database system identifies the branch sequence national, institute in the trie 300 as a key for the database record that stores the organization name National Institute of Health. Concluding this example, the database system tags the node after the institute branch in the trie 300 with the key national institute, and adds the database record that stores the organization name National Institute of Health to a list of records for the key national institute. A node threshold can be the magnitude or intensity that must be met or exceeded for a certain reaction, phenomenon, result, or condition to occur or be manifested. A key can be a prefix of a field in a record that is used to lookup the record.

Having prepared the trie for shallow matching, a branch sequence in the trie is identified as a key for a prospective record, based on a prospective value stored in a corresponding field by the prospective record, block 210. The database system identifies keys in the trie for shallow matching prospective records. By way of example and without limitation, this can include the database system identifying the branch sequence "Regional Medical" in the trie as the key for the previously existing database record that stores "Regional Medical Center" in the organization name attribute field that is mapped to the hospital name attribute field. For this example, a branch sequence in the trie is identified as a key for a prospective record from the existing database records, based on a prospective value stored in the prospective record's field that is mapped with the dataset records' field that stores values used to create the trie.

Alternatively, the database system identifies the branch sequence "Regional Medical" in the trie as the key for the dataset record that stores "Regional Medical Centre" in the hospital name attribute field that is mapped to the organization name attribute field. For this example, a branch sequence in the trie is identified as a key for a prospective record from the dataset records, based on a prospective value stored in the prospective record's field that is the dataset records' field that stores values used to create the trie. A prospective record can be at least one stored value that could potentially be stored in a database. A prospective value can be a symbol that could potentially be stored in a database of records.

Identifying the branch sequence as the key for the prospective record may include tokenizing the prospective value stored in the corresponding field by the prospective record; identifying each node, beginning from a root of the trie, corresponding to a token value sequence associated with the tokenized prospective value, until another node is identified that stores a count that is less than a node threshold; and identifying a key associated with the other node as the key for the prospective record. For example, the database system tokenizes the organization name National Institute of Hlth as <national, institute, of hlth> for a prospective record during a lookup phase. Continuing the example, the database system uses the tokenized values national, institute, of hlth to identify that a first sequential node in the trie 300 stores the count 3 for the token value sequence national, and stops after identifying that a second sequential node in the trie 300 stores the count 1 for the token value sequence national, institute, because this second sequential node's count 1 is less than the threshold count of 2.5, as depicted in FIG. 3. Completing this example, the database system identifies the branch sequence national, institute as the key for the prospective record that stores the organization name National Institute of Hlth.

Having identified the key for the prospective record, the key is used to identify a record of the multiple records that matches the prospective record, block 212. The database system uses a prospective record's key to shallow match the prospective record with another record. In embodiments, this can include the database system using the "Regional Medical" key to identify the 1$^{st}$ dataset record that stores the value "Regional Medical Centre" in the hospital name attribute field as a shallow match for the previously existing database record that stores "Regional Medical Center" in the organization name field. For this example, the record of the multiple records is a dataset record which matches the prospective record that is an existing database record. The database system was able to identify the records as shallow matching, even though their name values did not match exactly, using a key based on only the first 2 words of the prospective record's 3 word organization name value.

Alternatively, the database system uses the "Regional Medical" key to identify the existing database record that stores the value "Regional Medical Center" in the organization name attribute field as a match for the dataset record that stores "Regional Medical Centre" in the hospital name attribute field. For this example, the record of the multiple records is an existing database record which matches the prospective record that is a dataset record. The database system was able to identify the records as shallow matching, even though their name values did not match exactly, using a key based on only the first 2 words of the prospective record's 3 word hospital name value.

Finishing the example based on the trie 300 depicted in FIG. 3, the database system uses the key national institute for the prospective record to identify that the database record that stores the organization name National Institute of Health matches the prospective record that stores the organization name National Institute of Hlth. The database system was able to identify the records as shallow matching, even though their name values did not match exactly, using a key based on only the first 2 words of the prospective record's 4 word organization name value (The article "the" is ignored). Matching records can be stored values that correspond to each other in some essential respect.

The method 200 may be repeated as desired. Although this disclosure describes the blocks 202-212 executing in a particular order, the blocks 202-212 may be executed in a different order. In other implementations, each of the blocks 202-212 may also be executed in combination with other blocks and/or some blocks may be divided into a different set of blocks.

The disclosed database system creates optimized match keys for fields having a prefix structure. A prefix structure can be a field value that includes a sequences of tokens, in which the sequencing order is important. Examples of such fields include zip codes, telephone numbers, organization names, city names, and street addresses. The database system creates an index for such a field and identifies the key values that cast as wide a net as possible, subject to performance constraints, which can result in some key values being shorter than other key values. For example, zip code-based keys for higher-density areas of the USA may use all five digits, while zip code-based keys for in lower-density areas may use only the first three digits. Therefore, the zip code-based keys that use only the first three digits will thus tolerate errors in the last two digits.

The database system executes three phases, a build phase, an index-time use phase, and a lookup-time use phase. During the build phase, the database system uses tokenized values of a field in the database to build or create a trie data structure that is used by subsequent phases. The trie is a tree of prefix sequences found in the field, with, every branch labeled by a token value. A root-to-node path yields a sequence of tokens, which is formed by concatenating the labels of all the branches in the path, starting from the root. The database system stores into each node the count of records in the database in which this field's value has that particular prefix sequence. When the database system receives a new field value, the database system references the trie for the field to identify the path that is the field value's unique prefix. If the prefix does not extend to the end of the full sequence, then the database system extends the trie so that the field value's unmatched suffix becomes a path below the current path. Next, the database system increments the counts for all nodes in this path by 1. The database system does not need to be fully build a trie, as the database system can freeze a node if the node's post-list size is less than a parameter s. The database system will not subsequently extend a frozen node.

FIG. 3 depicts an example of a trie 300 that the database system creates based on the following example field values tokenized at the word level. The organization name National Institute of Health is tokenized as <national, institute, of health>, the organization name National Cancer Center is tokenized as <national, cancer, center>, the organization name National Science Board is tokenized as <national, science, board>, the organization name Amazon A9 is tokenized as <amazon, a9>, the organization name Amazon Web Services is tokenized as <amazon, web, services>, the organization name Starbucks Coffee is tokenized as <starbucks, coffee> and the organization name Starbucks Manufacturing is tokenized as <starbucks, manufacturing>. The tie 300 is an extremely simplified trie 300 because such a trie in a production environment may include thousands of nodes and branches, which would be far too complex for depiction in this figure.

The database system identifies a key for the organization name National Institute of Health that is as short a prefix as reasonably possible, which maximizes the ability to cope with errors and abbreviations in the organization name. First, the database system considers the prefix national as the potential key, when examining the trie 300, which indicates that there are too many records whose organization name begins with national. When the database system considers national institute as the potential key, the trie 300 indicates that there are a manageable number of records whose organization name begins with national institute. Therefore, the database system uses national institute as the key for the organization name National Institute of Health.

If the database system receives a new record for matching with the database's records, and the new record includes the organization name National Institute of Hlth, the database system goes through the same procedure with the trie 300 and again identifies national institute as the key for the new record. Therefore, records with either the full organization name or the abbreviated organization name will have the same value for the organization name index, allowing them to be grouped together for matching.

Zip/Postal code values are examples of fields with a prefix structure. Prefixes of zip codes correspond to broader geographic areas, at least for USA zip codes and Canadian postal codes. Telephone number values are also examples of fields with a prefix structure. Prefixes of telephone numbers generally correspond to broader instances, in geographic area or population. Organization names are examples of fields with a prefix structure because the least informative words, which may be referred to as stop words, tend to be the rightmost words in an organization name, such as Inc., Corp., and LLC., while the most informative words tend to be at the beginning of the organization name. For example, in the organization name Cisco Systems, Cisco is more informative than Systems. USA street addresses have a prefix structure because they have a sequential structure, with the most common pattern: <street number><street name><street suffix>.

The database system exploits prefix structure not only because there is a simple and elegant way to capture post-list sizes of prefixes (which are used at index time to optimize the keys) but also because fuzzy variations tend to be in the suffixes of fields with a prefix structure. For example, for zip codes and telephone numbers of matching records (such as contacts or accounts) the tail is more likely to differ than the head. This may be because people and companies tend to move in nearby locations, or a person gets assigned a new telephone number with the same three digit area code and the same three digit central office code, but with a different four digit station number. In organization name fields, stop words that are in the suffixes, such as Inc., Corp., and LLC., are more likely to be left off than the first word in the organization name. In USA street addresses, the content in the tail, such as suite number or floor number, is more likely to be left off than the content in the head of the street address.

The database system can use a normalizer to detect and strip away blanks in a field value, which often occur in Canadian and British postal codes. The database system can also use a normalizer to detect and strip away international codes, and non-digit characters from telephone numbers. The database system may tokenize zip codes and telephone numbers at the level of individual characters, and tokenize an organization name and street addresses at the level of words, or at the level of syllables.

A USA telephone number is in the format XXX-YYY-ZZZZ, where XXX is the area code, YYY is the central office code, and ZZZZ is the station number. It is not uncommon for people entering information for records to leave off the area code. To accommodate this, the database system generates a second value from the normalized value of a USA telephone, in which the second value has the area code removed. Both values are used when the database system builds the corresponding tries.

After the database system builds a trie during the build phase, the database system uses the trie at index time as follows. Suppose the database system is indexing record r on a particular field having a prefix structure for which its trie has been built. First, the database system normalizes this field's value in r, and tokenizes it the same way as in the build phase. Next, if the database system needs to derive additional token value sequences from this, the database system does so, such as generating a value without the area code for USA telephone phone numbers. For each token value sequence (in most cases there is only one), the database system references the corresponding trie to identify the shortest prefix p with a sufficiently small post-list size. The database system adds the record r to the prefix p's post-list. The database system also marks the node in the trie at which the prefix p ends with a tag indicating that this prefix was indexed. The database system will use this tag at lookup time.

By using the prefix p as the key, the database system will identify any record whose field value starts with this prefix. However if there are fuzzy variations (such as spelling errors) inside of the prefix p itself, the database system may not identify a matching record. Therefore, the database system focuses on the following four operators to improve recall for such fuzzy variations: a transposition operator, which randomly exchanges adjacent tokens, a blurred-substitution operator, which replaces a random token by a place-holder, an insertion operator, which inserts a place-holder token at a random position, and a deletion operator, which deletes a token at random position. After applying any of these operators to the prefix p, the database system generates a new key. The database system may have a parameter b that specifies a budget—the maximum number of such operations allowed—when indexing a field with a prefix structure. Let n denote the number of records in the database to be indexed. The database system allocates a budget of operations to the prefix p, allocating b/4n to each of the four operation types. The database system creates up to b/4n copies of the prefix p by transposing tokens at positions i and i+1, where i is selected randomly without replacement to be a position in the prefix p. The database system creates up to b/4n copies of the prefix p by blurring the token at the position i, where i is selected randomly without replacement to be a position in the prefix p. The database system creates up to b/4n copies of the prefix p by inserting a place-holder token after the token at the position i, where i is selected randomly without replacement to be a position in the prefix p. The database system creates up to b/4n copies of the prefix p by deleting a token at the position i, where i is selected randomly without replacement to be a position in the prefix p. If the database system creates less than b/n new keys for a prefix p, the database system may add the residual value towards the budget of the next field or the next record.

At look-up time, the database system follows the same process as at index time. Specifically, first the database system normalizes the field value, then tokenizes the field value, then identifies the shortest prefix p in the corresponding trie whose post-list size is sufficiently small, then generates fuzzy variants of the prefix p as done in the indexing phase.

For example, the database system accesses records in a large database of organization-at-location records, such as the database provided by Dun & Bradstreet, creates a trie for the field organization name, references the organization name trie to identify organization name keys for the records, creates a trie for the field city name, and references the city name trie to identify city name keys for the records. When the database system attempts to determine whether a suspect record having non-null values for organization name and city name matches any of the database records, the database system needs to determine which of the two indices—organization name prefix or city name prefix—should be used in the look up phase. The post-list sizes of each the keys in the suspect record may be unacceptably large, such as when the organization name is Starbucks and the city name is New York City, as there are a large number of Starbucks locations and a large number of organizations are located in New York City. In this case, the database system may use the lookup organization-name-prefix=starbucks AND city-name-prefix=new york.

The post-list sizes of one the keys in the suspect record may be small enough, such as when the city is Topeka, as a small number of organizations are located in Topeka, and the organization name is Starbucks. In this case, the database system may use the lookup city-name-prefix=topeka, intentionally omitting the use of the organization-name-prefix to favor recall, as the organization name in the suspect record may include a spelling error—such as sturbucks.

The post-list sizes of each the keys in the suspect record may be small enough, such as when the city name is Topeka and the organization name is Frito-Lay. In this case, the database system may use the lookup organization-name-prefix=frito-lay OR city-name-prefix=topeka, which favors recall even more.

These examples imply that the database system should setup indices in such a way that at lookup time the database system can specify certain Boolean queries, such as ANDs and ORs, over various keys. The database system can store the indices in an enterprise search platform, such as SOLR, which enables the database system to leverage built-in mechanisms for specifying any Boolean query over the indices.

Given a suspect record, the database system needs to generate an efficient indexes query. Suppose the indexed keys in the suspect record are $x_1, x_2, \ldots x_k$. Here $x_i$ is the key for the attribute i. The tags in the tries are used to find where the keys end. Attributes are identified by position for notational convenience. First, the database system sorts the keys by their post-list sizes in non-decreasing order. The post-list sizes are the counts in the nodes in the tries that correspond to the keys. Let the index sequence in the sorted order be $\pi_1, \pi_2, \ldots \pi_k$, a certain permutation of $1, 2, \ldots k$, and the corresponding post-list sizes be $s_{\pi 1}, s_{\pi 2}, \ldots s_{\pi k}$. Let M denote the maximum candidate list size that is deemed acceptable. Either there exists the longest sequence of prefixes $\pi_1, \pi_2, \ldots \pi_j$ of $\pi_1, \pi_2, \ldots \pi_k$ so that the sum of the post-list sizes in this prefix sequence does not exceed M, or such a prefix sequence does not exist. If such a prefix sequence exists, the database system formulates the OR query, $x_{\pi 1}$ OR $x_{\pi 2}$ OR $\ldots$ OR $x_{\pi j}$.

If such a prefix sequence does not exist, the database system defines $P_{\pi i} = s_{\pi i}/n_{\pi i} = 1, \ldots k$. Here $n_{\pi i}$ is the post-list size at the root of the trie of the attribute $\pi_i$. More simply, $n_{\pi i} = n$, where n is the number of records in the database that is indexed, which can be the number of documents in the SOLR index. Next, the database system identifies the shortest sequence of prefixes $\pi_1, \pi_2, \ldots \pi_j$ of $\pi_1, \pi_2, \ldots \pi_k$, satisfying $s_{\pi 1} * P_{\pi 2} \ldots * P_{\pi j} \leq M$ which estimates the candidate list sizes of intersections of keys under the assumption of independence of attributes. This assumption can sometimes be completely wrong.

For example, relevant data for matching suspect records is in the table below. Each cell has a value x/y where x is the attribute value and y the post-list size of the key with this same attribute value.

| Organization Name | City | Phone |
|---|---|---|
| Starbucks/20k | New York City/5k | 212/25k |
| Frito-Lay/50 | Topeka/50 | 785/600 |

Suppose M=500 and the database has 1,000,000 records. For the first suspect record, the database system generates the lookup query organization-name-prefix=starbucks AND city-name-prefix=new york, based on the estimated candidate list size of 100, derived from the equation 20,000 multiplied by 5,000 divided by 1,000,000 equals 100, which is less than the M of 500.

The independence assumption may be relaxed. For example, the attributes organization name and website are often correlated, such as when the website of all organization-at-location instances in the database in which the organization name is Starbucks will likely be starbucks.com. Therefore, the database system performing an AND operation using the keys of the organization-name-prefix and the website prefix will likely not reduce the candidate list size by much, if at all. Consequently, the database system can try to find a set of attributes that are as pairwise uncorrelated as possible, and/or can estimate the candidate set size more accurately when correlations are present. The input is the order of $\pi_1, \pi_2, \ldots \pi_k$, i.e. the keys are in order of non-decreasing post-list size.

$L \leftarrow \pi_1$
$s \leftarrow s_{\pi 1}$
while $|L| < k$
Find $\pi_j$ $_{not\ in\ L}$ □ L which minimizes $(1/|L|)*\Sigma_{j\ in\ L}\ m_{\pi jl}$, where $m_{\pi jl}$ is the mutual information [1] between attributes $\pi_j$ and l
  Add $\pi_j$ to L
  $s \leftarrow s*f(P_{\pi j}, m_{jL})$
  Break if s<m
Endwhile When two attributes are (fully) independent, their mutual information is 0. In this case, f(P, m) needs to equal P. As dependence increases, mutual information starts increasing. So as m increases, f(P, m) needs to go to 1. The following function approximately produces this behavior.

$$f(P,m)=\tan h((1+m)*P)$$

When P is small, f(P, 0)=tan h(P) P. As m increases, tan h((1+m)*P) approaches 1. From these constraints, the form and parameters of f(P, m) are derived. First, assume that the maximum value of the average mutual information $(1/|L|)*\Sigma m_{\pi j l}$ is known, and denote it a.

f(P, 0) needs to =P and f(P, a)→1. The following function approximately achieves this.

$$f(P,m)=(2/(1+e^{-\mu(m)*P})-1) \text{ where } \mu=1/a*\ln(1-2/1.99)$$

The form of f(P, m) is a hyperbolic tangent, which is just 2σ−1, where σ is the usual sigmoid. The slope μ(m) of this function needs to depend on m, being small when m is small and large when m is large. In more detail, f(P. m) equals P when m is 0 and has a sigmoidal curve passing through f(0, m)=0 and f(0, a)=0.99.

The database system can start with the attribute whose key has the smallest post-list size, and then try to find an attribute among the rest of the attributes that is maximally independent of this attribute. The database system can compute the new estimated result set size s after adding this attribute, and repeat the process. The mutual information of any two attributes can be estimated offline from the database in advance. The resulting matrix (of mutual information of pairs of attributes) will be relatively small if there are relatively few attributes.

One use case is multi-tenant deduplicating, which involves de-duplicating objects—especially contacts, leads, and accounts—within each tenant or organization. For this purpose, the database system builds tenant or organization-specific indices to group together candidate duplicates in the organization's objects. Typical indexing algorithms used presently in production are parametrized, but these parameters are not exploited to use different settings for different organizations when appropriate. The disclosed database system can automatically tune the organization-specific indices to the organization's data, and moreover at a much more granular level than even possible with the approaches presently in production. Organization sizes, characterized by the number of account, contact, lead, and other objects in the organization, can vary greatly. There may be a large number of extremely small organizations having fewer than 1,000 records of each type. At the other extreme, there may be a small number of extremely large organizations, each having more than 10 million records of each type. The disclosed database system maximizes the duplicate detection rate while remaining with performance limits. Initially, for clarity of exposition, assume that each organization has the same amount of computing resources available (such as central processing units, memory, and disk usage) for deduplicating, regardless of its size. In this case, the disclosed database system will automatically use very coarse keys for extremely small organizations, and fine keys for extremely large organizations. This is because for extremely small organizations, even very coarse keys will remain performant. For extremely large organizations, very coarse keys will likely not remain performant, so the disclosed database system uses finer keys, which risks failing to detect some duplicates. This problem can of course be mitigated by providing very large organizations with much more computing resources than smaller organizations.

Another use case is for matching customer relationship management (CRM) records with data marketplace data, which is data vendors offering their datasets for purchase by organizations. Such datasets tend to be specialized for particular verticals or for particular types of cross-vertical data. For an organization that purchases such a dataset, the database system can use matching to append the vendor's specialized data to appropriate objects stored by the organization. For example, an organization sells products and/or services to hospitals, and purchases a hospital-specific dataset from a vendor in the data marketplace which contains niche attributes such as hospital beds. Via matching the accounts in the organization that are hospitals will automatically get matched to the correct hospital in this dataset, and from this match important attributes in the vendor's data (such as the number of beds) will get appended to the CRM record where possible. A Data Marketplace will contain data of all sorts. In many cases, unknown attributes will be present. Ideally, the database system can index a new dataset without any human involvement. Following an initial configuration—which fields on a new dataset to put prefix indices on—the database system automatically creates optimal individual indices—indices that maximize recall while remaining performant for look-ups, and automatically generating an efficient multi-index query for a suspect record dynamically, again maximizing recall while remaining performant.

If the database stores data about information technology companies, the zip codes for Silicon Valley will likely be associated with a larger numbers of information technology companies than the zip codes for Topeka, Kans. Therefore, the database system may use finer zip code keys, such as 5 digits, for the Silicon Valley information technology companies than for the Topeka information technology companies, for which the database system may use coarser zip code keys, such as the first 3 digits. Continuing this example, the database system uses the key 666 for the Topeka zip code 66604. While the database system cannot generate any fuzzy variation of a key for this zip code by transposition, the database system can generate substitution expansions, such as 66c04 and c6604. Therefore, in this example the 666 prefix will cover all variations in the last two digits while keeping the post-list size manageable, and the substitution expansions will cover errors in the first or third digit.

The database system normalizes the telephone number 515-123-4567 as the normalized number 5151234567, uses the normalized number to build a trie of telephone numbers, strips the area code to create the stripped number 1234567, and adds the stripped number to the trie of telephone numbers. At index time, the database system references the corresponding tries to identify the shortest acceptable prefix for the normalized number, such as 515123, and the stripped number, such as 123456. Next, the database system generates new fuzzy variations from each of these prefixes by applying the transposition, blurred-substitution, insertion, and deletion operators as previously described. For example, the database system generates the additional keys 155123, 551123, 515213, 515c23, 5c5123, 51123, 51512c3 for the prefix 515123.

Figure 4:
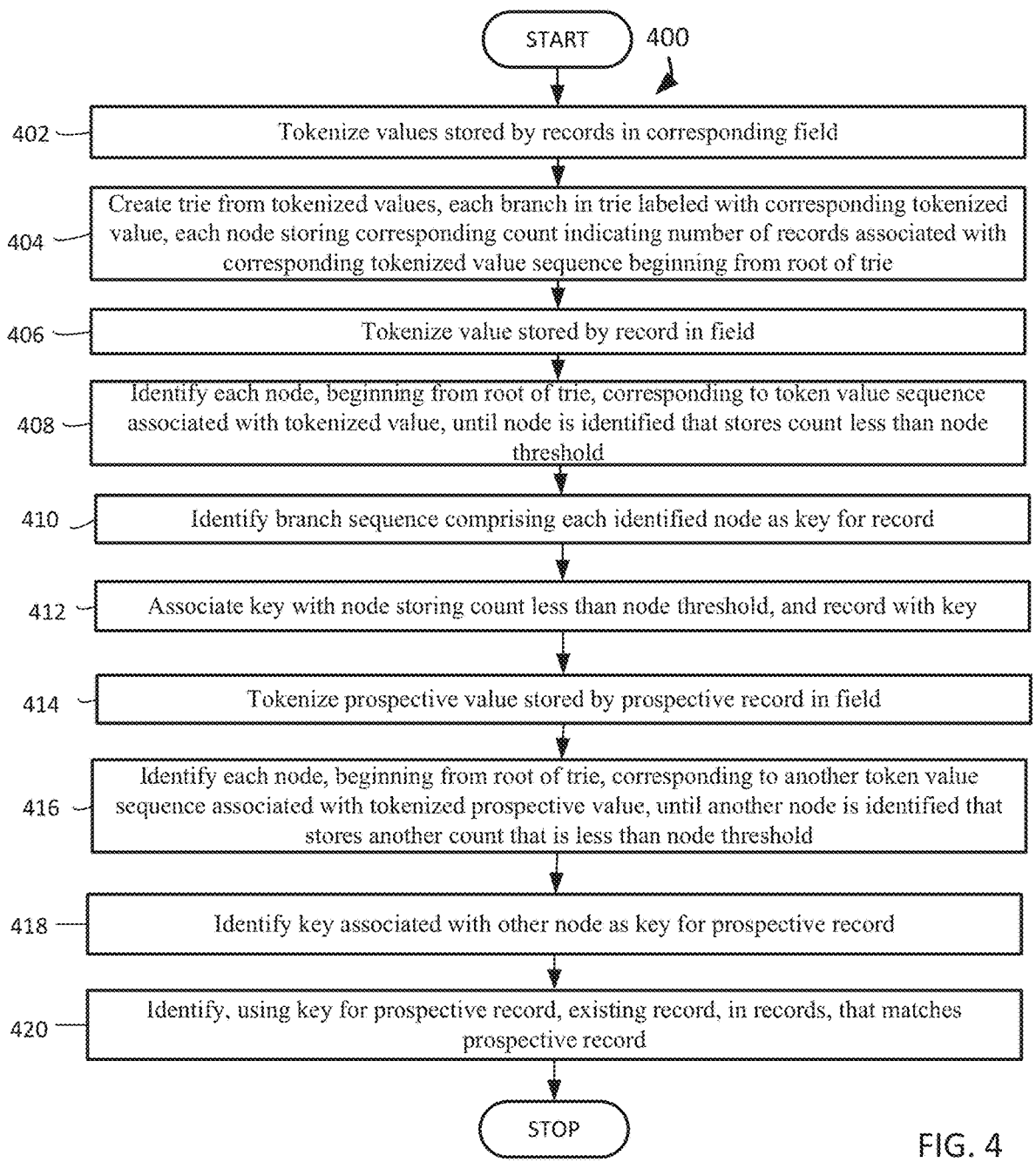
FIG. 4 is an operational flow diagram illustrating a high level overview of another method for match index creation, in an embodiment.

FIG. 4 is an operational flow diagram illustrating a high level overview of a method 400 for match index creation. Values stored in a corresponding field by records are tokenized, block 402. The database system tokenizes record field values to create a trie that will be used during record indexing and record lookup. For example and without limitation, this can include the database system tokenizing the organization names for database records, including tokenizing National Institute of Health as <national, institute, of health>, National Cancer Center as <national, cancer, center>, and National Science Board as <national, science, board>, Amazon Web Services as <amazon, web, services>, Amazon A9 as <amazon, a9>, Starbucks Coffee as <starbucks, coffee>, and Starbucks Manufacturing as <starbucks, manufacturing>. In an alternative example, the database system tokenizes city names for database records, including New York City as <new, york, city> and Topeka as <topeka>. A value can be the symbols on which operations are performed by a computer, being stored and transmitted in the form of electrical signals and recorded on magnetic, optical, or mechanical recording media. A record can be the storage of at least one value in a persistent form. A field can be a part of a record, representing an item of data. Tokenizing can be the process of dividing a stream of text up into words, phrases, symbols, or other meaningful elements, which may be referred to as tokens.

Having tokenized the database records' values, a trie is built from the tokenized values, each branch in the trie labeled with a corresponding tokenized value, each node storing a corresponding count indicating a number of the records associated with a corresponding tokenized value sequence beginning from a root of the trie, block 404. The database system will use the trie during record indexing and record lookup. By way of example and without limitation, this can include the database system creating a trie that includes a branch labelled national from the trie root to a first sequential node; branches labelled institute, cancer, science from the first sequential node to the second sequential nodes; branches labelled of, center, and board from the second sequential nodes to the third sequential nodes, and a branch labelled health from a third sequential node to a fourth sequential node, as depicted in FIG. 3. The first sequential node stores the count 3 for the 3 organization names that include national, the second sequential nodes each store the count 1 for the 1 corresponding organization name that includes institute, cancer, or science, the third sequential nodes each store the count 1 for the 1 corresponding organization name that includes of, center, or board, and the fourth sequential node stores the count 1 for the 1 organization name that includes health.

The trie 300 in FIG. 3 also includes a branch labelled amazon from the trie root to a first sequential node; branches labelled web, a9 from the first sequential node to the second sequential nodes; and a branch labelled services from a second sequential node to a third sequential node. The first sequential node stores the count 2 for the 2 organization names that include amazon, the second sequential nodes each store the count 1 for the 1 corresponding organization name that includes web or a9, and the third sequential node stores the count 1 for the 1 organization name that includes services.

The trie 300 in FIG. 3 additionally includes a branch labelled starbucks from the trie root to a first sequential node, and branches labelled coffee and manufacturing from the first sequential node to the second sequential nodes. The first sequential node stores the count 2 for the 2 organization names that include starbucks, and the second sequential nodes each store the count 1 for the 1 corresponding organization name that includes coffee or manufacturing.

In an alternative example, the database system creates a trie from the tokenized values of the city name values stored in the database records' city name fields. A trie can be a tree-like ordered data structure that is used to store a dynamic set or associative array of values, where the search keys are usually strings. A branch can be a subdivision or a lateral extension extending from the main part of a tree or a trie. A node can be a connecting point at which lines or pathways in a tree or trie intersect or branch. A root can be the originating point of a tree or trie. A number and/or a count can be an arithmetical value, expressed by a word, symbol, or figure, representing a particular quantity and used in making calculations and for showing order in a series or for identification. Tokenized values can be symbols or text divided into words, phrases, symbols, or other meaningful elements. A tokenized value sequence can be a particular order in which divided words, phrases, symbols, or elements follow each other.

After the trie is built, a value stored in a field by a record is tokenized, block 406. The database system tokenizes a record's value to index the record, and uses the indexing during record lookup. In embodiments, this can include the database system tokenizing the organization name National Institute of Health as <national, institute, of health> for a database record during the indexing phase. In an alternative example, the database system tokenizes the city name New York City as <new, york, city> for a database record during the indexing phase.

Once the record's value is tokenized, each node is identified, beginning from the root of the trie, corresponding to a token value sequence associated with the tokenized value, until a node is identified that stores a count that is less than a node threshold, block 408. The database system identifies specific nodes during record indexing to identify keys used during record lookup. For example and without limitation, this can include the database system using the tokenized values national, institute, of health to identify that a first sequential node stores the count 3 for the token value sequence national, and stop after identifying that a second sequential node stores the count 1 for the token value sequence national, institute, because this second sequential node's count 1 is less than the token threshold count of 2.5. In an alternative example, the database system stops after identifying that a second sequential node stores a count that is less than a token threshold count for the token value sequence new, york. A node threshold can be the magnitude or intensity that must be met or exceeded for a certain reaction, phenomenon, result, or condition to occur or be manifested.

Following the identification of nodes, a branch sequence comprising each identified node is identified as a key for the record, block 410. During record indexing, the database system identifies keys used during record lookup. By way of example and without limitation, this can include the database system identifying the branch sequence national, institute as the key for the database record that stores the organization name National Institute of Health. In an alternative example, the database system identifies the branch sequence new, york as the key for the database record that stores the city name New York City. A branch sequence can be a particular order in which subdivisions or lateral extensions extending from the main part of a tree or a trie follow each other. A key can be a prefix of a field in a record that is used to lookup the record.

When the database system identifies the branch sequence that includes each identified node as the key for the record, the database system may also create a transposed key for the record by exchanging adjacent tokens in the key, create a substitution based key for the record by substituting a placeholder for a token in the key for the record, create an insertion based key for the record by inserting a placeholder in the key for the record, and/or create a deletion based key for the record by deleting a token in the key for the record. For example, when the database system identifies 515123 as the key for the database record that stores the telephone number 515-123-4567, the database system also creates the transposed key 551123, the substitution based key 595123, the insertion based key 5015123, and the deletion based key 51523 for the database record that stores the telephone number 515-123-4567. Creating fuzzy variations of keys for database records and for prospective records enables the database system to match these records even when the database records and/or the prospective records include errors. Although this example illustrates the database system creating one of each type of fuzzy variation key for the key, the database system may create any number of each type of fuzzy variation key for the key. For example, if the database system has a fuzzy variation budget of 12,000,000 and stores 1,000,000 records, then the database system creates a total of 12 fuzzy variations (12,000,000 divided by 1,000,000) for each key, such as creating 3 transposed keys, 3 substitution based keys, 3 insertion based keys, and 3 deletion based keys for each key.

Once the key is identified, the key is associated with the node storing the count less than the node threshold, and the record is associated with the key, box 412. The database system uses the key to identify matching records during record lookup. In embodiments, this can include the database system tagging the node after the institute branch with the key national institute, and adding the database record that stores the organization name National Institute of Health to a list of records for the key national institute, and to the lists of records for any corresponding fuzzy variation keys. In an alternative example, the database system tags the node after the york branch with the key new york, and adds the database record that stores the city name New York City to a list of records for the key new york, and to the lists of records for any corresponding fuzzy variation keys.

When record indexing is completed, a prospective value stored in the field by a prospective record is tokenized, block 414. The database system tokenizes a prospective record's field value to identify matching records based on the tokenized values. For example and without limitation, this can include the database system tokenizing the organization name National Institute of Hlth as <national, institute, of hlth> for a prospective record during a lookup phase. In an alternative example, the database system tokenizes the city name New York City as <new, york, city> for a prospective record during the lookup phase. A prospective record can be at least one stored value that could potentially be stored in a database. A prospective value can be a symbol that could potentially be stored in a database of records.

Following the tokenizing of the prospective value, each node is identified, beginning from the root of the trie, corresponding to another token value sequence associated with the tokenized prospective value, until another node is identified that stores another count that is less than the node threshold, block 416. The database system identifies specific nodes to identify a key for the prospective record. By way of example and without limitation, this can include the database system using the tokenized values national, institute, of hlth to identify that a first sequential node stores the count 3 for the token value sequence national, and stop after identifying that a second sequential node stores the count 1 for the token value sequence national, institute, because this second sequential node's count 1 is less than the threshold count of 2.5 In an alternative example, the database system stops after identifying that a second sequential node stores a count that is less than a token threshold count for the token value sequence new, york.

Having identified the other node, a key associated with the other node is identified as a key for the prospective record, block 418. The database system uses the key for the identified node as the key for the prospective record. In embodiments, this can include the database system identifying the branch sequence national, institute as the key for the prospective record that stores the organization name National Institute of Hlth. In an alternative example, the database system identifies the branch sequence new, york as the key for the prospective record that stores the city name New York City.

When the database system identifies the key associated with the other node as the key for the prospective record, the database system may also identify another key associated with another corresponding field in the prospective record as another key for the prospective record. For example, the database system identifies starbucks as a key for the prospective record that stores the organization name Starbucks, identifies new york as a key for the same prospective record, which stores the city name New York City, and identifies the 212 as a key for the same prospective record, which stores the phone number 212-123-4567. In another example, the database system identifies frito as a key for the prospective record that stores the organization name Frito-Lay, identifies topeka as a key for the same prospective record, which stores the city name Topeka, and identifies 785 as a key for the same prospective record, which stores the phone number 785-345-6789.

When the database system identifies the key associated with the other node as the key for the prospective record, the database system may also create a transposed key for the prospective record by exchanging adjacent tokens in the key for the prospective record, create a substitution based key for the prospective record by substituting a placeholder for a token in the key for the prospective record, create an insertion based key for the prospective record by inserting a placeholder in the key for the prospective record, and/or create a deletion based key for the prospective record by deleting a token in the key for the prospective record. For example, when the database system identifies 515123 as the key for the database record that stores the telephone number 515-123-4568, the database system also creates the transposed key 551123, the substitution based key 595123, the insertion based key 5015123, and the deletion based key 51523 for the database record that stores the telephone number 515-123-4568. Creating fuzzy variations of keys for database records and for prospective records enables the database system to match these records even when the database records and/or the prospective records include errors. Although this example illustrates the database system creating one of each type of fuzzy variation key for the key, the database system may create any number of each type of fuzzy variation key for the key. For example, if the database system has a fuzzy variation budget of 12,000,000 and stores 1,000,000 records, then the database system creates a total of 12 fuzzy variations (12,000,000 divided by 1,000,000) for each key, such as creating 3 transposed keys, 3 substitution based keys, 3 insertion based keys, and 3 deletion based keys for each key.

After the key is identified for the prospective record, the key for the prospective record is used to identify an existing record, in the records, which matches the prospective record, block 420. For example and without limitation, this can include the database system using the key national institute for the prospective record to identify that the database record that stores the organization name National Institute of Health shallow matches the prospective record that stores the organization name National Institute of Hlth. When the database system identifies the key national institute for the database record that stores the organization name National Institute of Hlth, the key national institute has a list of records that include the database record that stores the organization name National Institute of Health, which enables the database system to efficiently shallow match these two records. The database system is able to identify these records as candidates for multiple value matching, even though their organization names did not match exactly, using a key based on only the first 2 of the prospective record's 4 tokenized values. An existing record can be at least one value that is already stored in the database. Matching records can be stored values that correspond to each other in some essential respect.

When the database system identifies the existing record that shallow matches the prospective record, the database system may combine records associated with the key for the prospective record with other records associated with the other key associated with the other corresponding field in the prospective record. For example, the database system combines records in the starbucks key's list with records in the new york key's list with records in the 212 key's list. In another example, the database system combines records in the frito key's list with records in the topeka key's list with records in the 785 key's list.

In order to combine records associated with the key with other records associated with the other key, the database system can determine whether a sum of a count of the records associated with the key with another count of the records associated with the other key exceeds a record threshold. For example, the database system identifies that the starbucks key's list includes 20,000 records, the new york key's list includes 5,000 records, and the 212 key's list includes 25,000 records. Then the database system sorts these counts in non-decreasing order. For example, the database system sorts these counts as 5,000 for the new york key, 20,000 for the starbucks key, and 25,000 for the 212 key. Next, the database system sums as many of these counts as possible, until the sum exceeds a key threshold. For example, the database system determines that the smallest count 5,000 exceeds the record threshold value of 500, such that any sum of these counts exceeds the key threshold. If the sum of the count of the records associated with the key with the other count of the records associated with the other key does not exceed the record threshold, the database system can use a Boolean OR function to combine the records associated with the key with the other records associated with the other key. If the sum of the count of the records associated with the key with the other count of the records associated with the other key exceeds the record threshold, the database system can use a Boolean AND function to combine the records associated with the key with the other records associated with the other key. Since the sum of these counts exceeds the record threshold value of 500, the database system uses the Boolean AND function to combine 5,000 records in the new york key's list with the 20,000 records in the starbucks key's list. Since the database system estimates that such a use of the new york key's list and the starbucks key's list will result in 100 shallow matching records (5,000*20,000/1,000,000=100), and 100 shallow matching records does not exceed the target of 500 shallow matching records, then the database system does not have to use the Boolean AND function with the 212 key's list to reduce the estimated number of shallow matching records further.

In another example, the database system identifies that the frito key's list includes 50 records, the topeka key's list includes 50 records, and the 785 key's list includes 600 records. Then the database system sorts these counts as 50 for the frito key, 50 for the topeka key, and 600 for the 785 key. Next, the database system determines that the smallest count 50 plus the second smallest count 50 does not exceed the record threshold value of 500. However, since the largest count 600 exceeds the record threshold of 500 by itself, the database system does not include the largest count in the sum. Since the sum of the two smallest counts does not exceed the record threshold value of 500, the database system uses the Boolean OR function to combine 50 records in the frito key's list with the 50 records in the topeka key's list, which favors recall.

The method 400 may be repeated as desired. Although this disclosure describes the blocks 402-420 executing in a particular order, the blocks 402-420 may be executed in a different order. In other implementations, each of the blocks 402-420 may also be executed in combination with other blocks and/or some blocks may be divided into a different set of blocks.

System Overview

Figure 5:
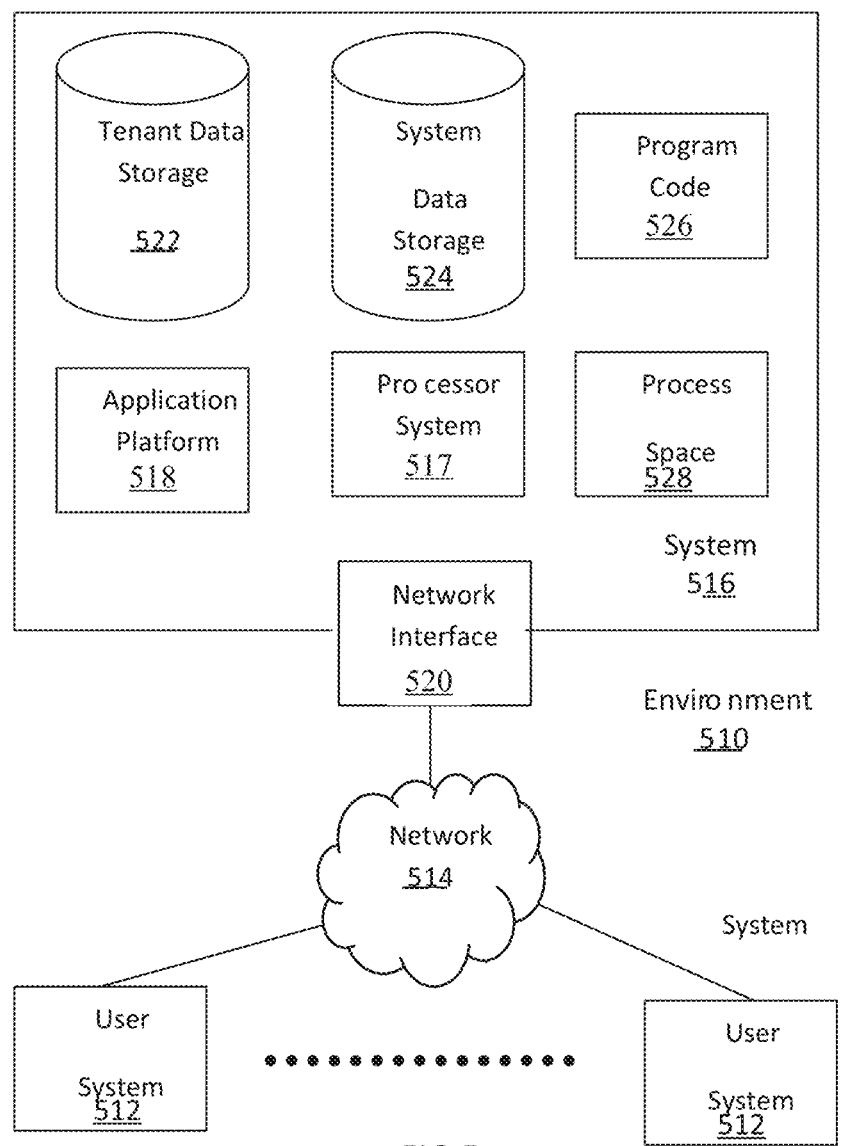
FIG. 5 illustrates a block diagram of an example of an environment wherein an on-demand database service might be used.

FIG. 5 illustrates a block diagram of an environment 510 wherein an on-demand database service might be used. The environment 510 may include user systems 512, a network 514, a system 516, a processor system 517, an application platform 518, a network interface 520, a tenant data storage 522, a system data storage 524, program code 526, and a process space 528. In other embodiments, the environment 510 may not have all of the components listed and/or may have other elements instead of, or in addition to, those listed above.

The environment 510 is an environment in which an on-demand database service exists. A user system 512 may be any machine or system that is used by a user to access a database user system. For example, any of the user systems 512 may be a handheld computing device, a mobile phone, a laptop computer, a work station, and/or a network of computing devices. As illustrated in FIG. 5 (and in more detail in FIG. 6) the user systems 512 might interact via the network 514 with an on-demand database service, which is the system 516.

An on-demand database service, such as the system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 516" and the "system 516" will be used interchangeably herein. A database image may include one or more database objects. A relational database management system (RDMS) or the equivalent may execute storage and retrieval of information against the database object(s). The application platform 518 may be a framework that allows the applications of the system 516 to run, such as the hardware and/or software, e.g., the operating system. In an embodiment, the on-demand database service 516 may include the application platform 518 which enables creation, managing and executing one or more applications developed by the provider of the on-demand database service, users accessing the on-demand database service via user systems 512, or third party application developers accessing the on-demand database service via the user systems 512.

The users of the user systems 512 may differ in their respective capacities, and the capacity of a particular user system 512 might be entirely determined by permissions (permission levels) for the current user. For example, where a salesperson is using a particular user system 512 to interact with the system 516, that user system 512 has the capacities allotted to that salesperson. However, while an administrator is using that user system 512 to interact with the system 516, that user system 512 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 514 is any network or combination of networks of devices that communicate with one another. For example, the network 514 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 512 might communicate with the system 516 using TCP/IP and, at a higher network level, use other common Internet protocols to communicate, such as HTTP, FTP, AFS, WAP, etc. In an example where HTTP is used, the user systems 512 might include an HTTP client commonly referred to as a "browser" for sending and receiving HTTP messages to and from an HTTP server at the system 516. Such an HTTP server might be implemented as the sole network interface between the system 516 and the network 514, but other techniques might be used as well or instead. In some implementations, the interface between the system 516 and the network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 516, shown in FIG. 5, implements a web-based customer relationship management (CRM) system. For example, in one embodiment, the system 516 includes application servers configured to implement and execute CRM software applications as well as provide related data, code, forms, webpages and other information to and from the user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 516 implements applications other than, or in addition to, a CRM application. For example, the system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of the system 516 is shown in FIG. 5, including the network interface 520, the application platform 518, the tenant data storage 522 for tenant data 523, the system data storage 524 for system data 525 accessible to the system 516 and possibly multiple tenants, the program code 526 for implementing various functions of the system 516, and the process space 528 for executing MTS system processes and tenant-specific processes, such as running applications as part of an application hosting service. Additional processes that may execute on the system 516 include database indexing processes.

Several elements in the system shown in FIG. 5 include conventional, well-known elements that are explained only briefly here. For example, each of the user systems 512 could include a desktop personal computer, workstation, laptop, PDA, cell phone, or any wireless access protocol (WAP) enabled device or any other computing device capable of interfacing directly or indirectly to the Internet or other network connection. Each of the user systems 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 512 to access, process and view information, pages and applications available to it from the system 516 over the network 514. Each of the user systems 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 516 or other systems or servers. For example, the user interface device may be used to access data and applications hosted by the system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 512 and all of its components are operator configurable using applications, such as a browser, including computer code run using a central processing unit such as an Intel Pentium® processor or the like. Similarly, the system 516 (and additional instances of an MTS, where more than one is present) and all of their components might be operator configurable using application(s) including computer code to run using a central processing unit such as the processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 516 is configured to provide webpages, forms, applications, data and media content to the user (client) systems 512 to support the access by the user systems 512 as tenants of the system 516. As such, the system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
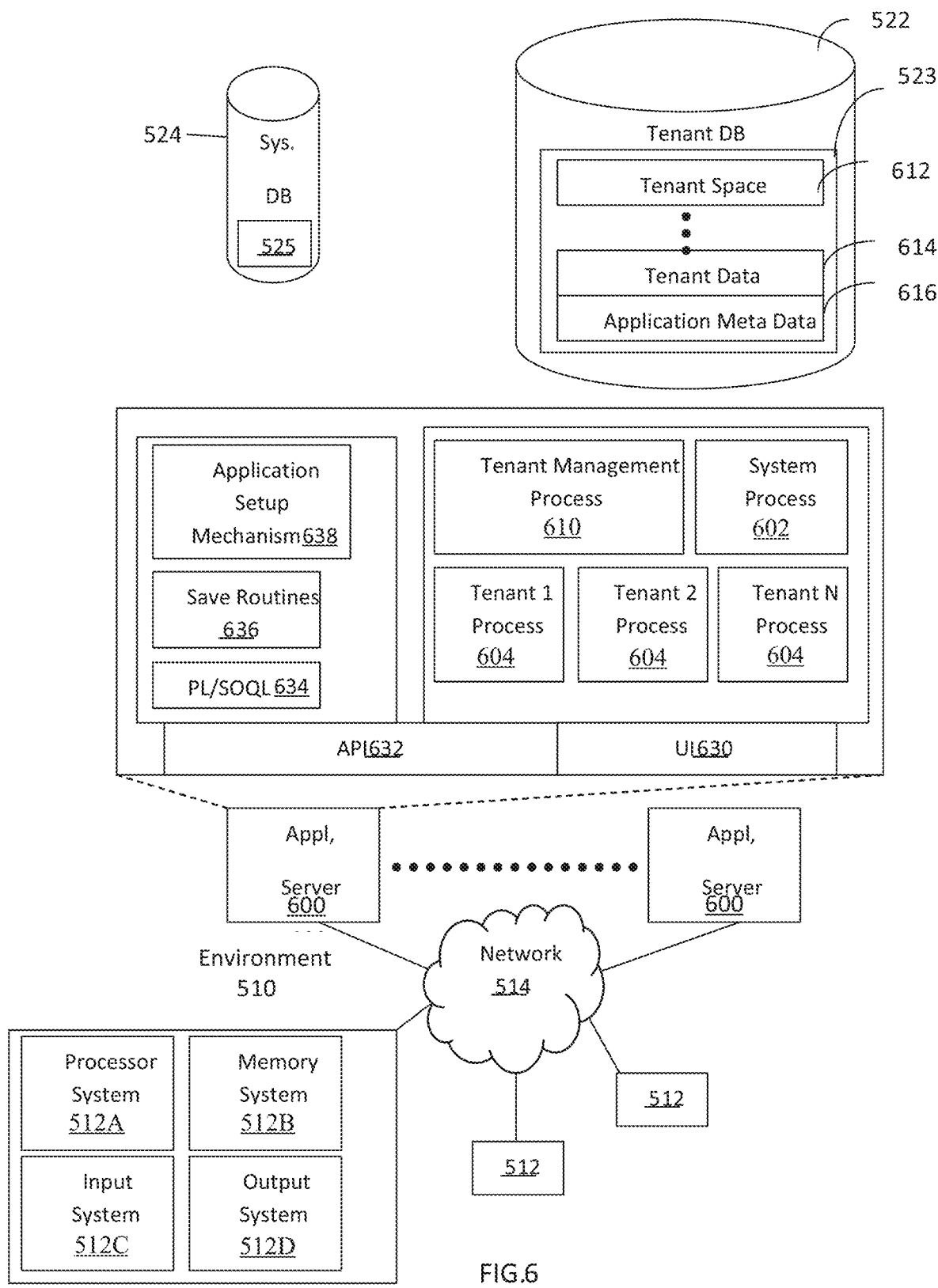
FIG. 6 illustrates a block diagram of an embodiment of elements of FIG. 5 and various possible interconnections between these elements.

FIG. 6 also illustrates the environment 510. However, in FIG. 6 elements of the system 516 and various interconnections in an embodiment are further illustrated. FIG. 6 shows that the each of the user systems 512 may include a processor system 512A, a memory system 512B, an input system 512C, and an output system 512D. FIG. 6 shows the network 514 and the system 516. FIG. 6 also shows that the system 516 may include the tenant data storage 522, the tenant data 523, the system data storage 524, the system data 525, a User Interface (UI) 630, an Application Program Interface (API) 632, a PL/SOQL 634, save routines 636, an application setup mechanism 638, applications servers $600_1$-$600_N$, a system process space 602, tenant process spaces 604, a tenant management process space 610, a tenant storage area 612, a user storage 614, and application metadata 616. In other embodiments, the environment 510 may not have the same elements as those listed above and/or may have other elements instead of, or in addition to, those listed above.

The user systems 512, the network 514, the system 516, the tenant data storage 522, and the system data storage 524 were discussed above in FIG. 5. Regarding the user systems 512, the processor system 512A may be any combination of one or more processors. The memory system 512B may be any combination of one or more memory devices, short term, and/or long term memory. The input system 512C may be any combination of input devices, such as one or more keyboards, mice, trackballs, scanners, cameras, and/or interfaces to networks. The output system 512D may be any combination of output devices, such as one or more monitors, printers, and/or interfaces to networks. As shown by FIG. 6, the system 516 may include the network interface 520 (of FIG. 5) implemented as a set of HTTP application servers 600, the application platform 518, the tenant data storage 522, and the system data storage 524. Also shown is the system process space 602, including individual tenant process spaces 604 and the tenant management process space 610. Each application server 600 may be configured to access tenant data storage 522 and the tenant data 523 therein, and the system data storage 524 and the system data 525 therein to serve requests of the user systems 512. The tenant data 523 might be divided into individual tenant storage areas 612, which can be either a physical arrangement and/or a logical arrangement of data. Within each tenant storage area 612, the user storage 614 and the application metadata 616 might be similarly allocated for each user. For example, a copy of a user's most recently used (MRU) items might be stored to the user storage 614. Similarly, a copy of MRU items for an entire organization that is a tenant might be stored to the tenant storage area 612. The UI 630 provides a user interface and the API 632 provides an application programmer interface to the system 516 resident processes to users and/or developers at the user systems 512. The tenant data and the system data may be stored in various databases, such as one or more Oracle™ databases.

The application platform 518 includes the application setup mechanism 638 that supports application developers' creation and management of applications, which may be saved as metadata into the tenant data storage 522 by the save routines 636 for execution by subscribers as one or more tenant process spaces 604 managed by the tenant management process 610 for example. Invocations to such applications may be coded using the PL/SOQL 634 that provides a programming language style interface extension to the API 632. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 616 for the subscriber making the invocation and executing the metadata as an application in a virtual machine.

Each application server 600 may be communicably coupled to database systems, e.g., having access to the system data 525 and the tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, the system 516 is multi-tenant, wherein the system 516 handles storage of, and access to, different objects, data and applications across disparate users and organizations.

As an example of storage, one tenant might be a company that employs a sales force where each salesperson uses the system 516 to manage their sales process. Thus, a user might maintain contact data, leads data, customer follow-up data, performance data, goals and progress data, etc., all applicable to that user's personal sales process (e.g., in the tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 516 might also maintain system level data usable by multiple tenants or other data. Such system level data might include industry reports, news, postings, and the like that are sharable among tenants.

In certain embodiments, the user systems 512 (which may be client systems) communicate with the application servers 600 to request and update system-level and tenant-level data from the system 516 that may require sending one or more queries to the tenant data storage 522 and/or the system data storage 524. The system 516 (e.g., an application server 600 in the system 516) automatically generates one or more SQL statements (e.g., one or more SQL queries) that are designed to access the desired information. The system data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for match index creation, the system comprising:
   one or more processors; and
   a non-transitory computer readable medium storing a plurality of instructions, which when executed, cause the one or more processors to:

identify, by a database system, a first number of distinct values stored in a first field by a dataset of records;

identify, by the database system, a second number of distinct values stored in a second field by the dataset of records;

determine, by the database system, whether the first number of distinct values stored in the first field is greater than the second number of distinct values stored in the second field;

create, by the database system, a trie from values stored in the first field by the dataset of records, in response to a determination that the first number of distinct values stored in the first field is greater than the second number of distinct values stored in the second field;

associate, by the database system, based on a value stored in the first field by a record of the dataset of records, a node in the trie with the record;

identify, by the database system, based on a prospective value stored in the first field by the prospective record, a branch sequence in the trie as a match key for a prospective record; and identify, by the database system, using the match key for the prospective record, a record of the dataset of records that matches the prospective record.

2. The system of claim 1, wherein the distinct values comprise distinct prefixes of text values, each distinct prefix being associated with a number of records of the dataset of records, the number of records being less than a record threshold.

3. The system of claim 1, wherein determining whether the first number of distinct values stored in the first field is greater than the second number of distinct values stored in the second field is based on counts of each distinct value stored in the first field and counts of each distinct value stored in the second field.

4. The system of claim 1, wherein determining whether the first number of distinct values stored in the first field is greater than the second number of distinct values stored in the second field is based on a count of numeric bins associated with values stored in the first field and a count of numeric bins associated with values stored in the second field.

5. The system of claim 1, wherein creating the trie comprises:
tokenizing, by the database system, the values stored in the first field by the dataset of records; and
creating, by the database system, the trie from the tokenized values, each branch in the trie labeled with one of the tokenized values, each node storing a count indicating a number of the dataset of records associated with a tokenized value sequence beginning from a root of the trie.

6. The system of claim 1, wherein associating the node in the trie with the record comprises:
tokenizing, by the database system, the value stored in the first field by the record;
identifying, by the database system, each node, beginning from a root of the trie, corresponding to a token value sequence associated with the tokenized value, until a node is identified that stores a count less than a node threshold;
identifying, by the database system, a branch sequence comprising each identified node as a match key for the record; and
associating, by the database system, the match key with the node, and the record with the match key.

7. The system of claim 1, wherein identifying the branch sequence as the match key for the prospective record comprises:
tokenizing, by the database system, the prospective value stored in the first field by the prospective record;
identifying, by the database system, each node, beginning from a root of the trie, corresponding to a token value sequence associated with the tokenized prospective value, until another node is identified that stores a count that is less than a node threshold; and
identifying, by the database system, a match key associated with the other node as the match key for the prospective record.

8. A computer program product comprising computer-readable program code to be executed by one or more processors when retrieved from a non-transitory computer-readable medium, the program code including instructions to:

identify, by a database system, a first number of distinct values stored in a first field by a dataset of records;

identify, by the database system, a second number of distinct values stored in a second field by the dataset of records;

determine, by the database system, whether the first number of distinct values stored in the first field is greater than the second number of distinct values stored in the second field;

create, by the database system, a trie from values stored in the first field by the dataset of records, in response to a determination that the first number of distinct values stored in the first field is greater than the second number of distinct values stored in the second field;

associate, by the database system, based on a value stored in the first field by a record of the dataset of records, a node in the trie with the record;

identify, by the database system, based on a prospective value stored in the first field by the prospective record, a branch sequence in the trie as a match key for a prospective record; and identify, by the database system, using the match key for the prospective record, a record of the dataset of records that matches the prospective record.

9. The computer program product of claim 8, wherein the distinct values comprise distinct prefixes of text values, each distinct prefix being associated with a number of records of the dataset of records, the number of records being less than a record threshold.

10. The computer program product of claim 8, wherein determining whether the first number of distinct values stored in the first field is greater than the second number of distinct values stored in the second field is based on counts of each distinct value stored in the first field and counts of each distinct value stored in the second field.

11. The computer program product of claim 8, wherein determining whether the first number of distinct values stored in the first field is greater than the second number of distinct values stored in the second field is based on a count of numeric bins associated with values stored in the first field and a count of numeric bins associated with values stored in the second field.

12. The computer program product of claim 8, wherein creating the trie comprises:
tokenizing, by the database system, the values stored in the first field by the dataset of records; and
creating, by the database system, the trie from the tokenized values, each branch in the trie labeled with one of the tokenized values, each node storing a count indicating a number of the dataset of records associated with a tokenized value sequence beginning from a root of the trie.

13. The computer program product of claim 8, wherein associating the node in the trie with the record comprises:
   tokenizing, by the database system, the value stored in the first field by the record;
   identifying, by the database system, each node, beginning from a root of the trie, corresponding to a token value sequence associated with the tokenized value, until a node is identified that stores a count less than a node threshold;
   identifying, by the database system, a branch sequence comprising each identified node as a match key for the record; and
   associating, by the database system, the match key with the node, and the record with the match key.

14. The computer program product of claim 8, wherein identifying the branch sequence as the match key for the prospective record comprises:
   tokenizing, by the database system, the prospective value stored in the first field by the prospective record;
   identifying, by the database system, each node, beginning from a root of the trie, corresponding to a token value sequence associated with the tokenized prospective value, until another node is identified that stores a count that is less than a node threshold; and
   identifying, by the database system, a match key associated with the other node as the match key for the prospective record.

15. A method comprising:
   identifying, by a database system, a first number of distinct values stored in a first field by a dataset of records;
   identifying, by the database system, a second number of distinct values stored in a second field by the dataset of records;
   determining, by the database system, whether the first number of distinct values stored in the first field is greater than the second number of distinct values stored in the second field;
   creating by the database system, a trie from values stored in the first field by the dataset of records, in response to a determination that the first number of distinct values stored in the first field is greater than the second number of distinct values stored in the second field;
   associating, by the database system, based on a value stored in the first field by a record of the dataset of records, a node in the trie with the record;
   identifying, by the database system, based on a prospective value stored in the first field by the prospective record, a branch sequence in the trie as a match key for a prospective record; and
   identifying, by the database system, using the match key for the prospective record, a record of the dataset of records that matches the prospective record.

16. The method of claim 15, wherein the distinct values comprise distinct prefixes of text values, each distinct prefix being associated with a number of records of the dataset of records, the number of records being less than a record threshold.

17. The method of claim 15, wherein determining whether the first number of distinct values stored in the first field is greater than the second number of distinct values stored in the second field is based on at least one of counts of each distinct value stored in the first field and counts of each distinct value stored in the second field, and a count of numeric bins associated with values stored in the first field and a count of numeric bins associated with values stored in the second field.

18. The method of claim 15, wherein creating the trie comprises:
   tokenizing, by the database system, the values stored in the first field by the dataset of records; and
   creating, by the database system, the trie from the tokenized values, each branch in the trie labeled with one of the tokenized values, each node storing a count indicating a number of the dataset of records associated with a tokenized value sequence beginning from a root of the trie.

19. The method of claim 15, wherein associating the node in the trie with the record comprises:
   tokenizing, by the database system, the value stored in the first field by the record;
   identifying, by the database system, each node, beginning from a root of the trie, corresponding to a token value sequence associated with the tokenized value, until a node is identified that stores a count less than a node threshold;
   identifying, by the database system, a branch sequence comprising each identified node as a match key for the record; and
   associating, by the database system, the match key with the node, and the record with the match key.

20. The method of claim 15, wherein identifying the branch sequence as the match key for the prospective record comprises:
   tokenizing, by the database system, the prospective value stored in the first field by the prospective record;
   identifying, by the database system, each node, beginning from a root of the trie, corresponding to a token value sequence associated with the tokenized prospective value, until another node is identified that stores a count that is less than a node threshold; and
   identifying, by the database system, a match key associated with the other node as the match key for the prospective record.

* * * * *